United States Patent
Vlach et al.

(10) Patent No.: US 8,983,103 B2
(45) Date of Patent: Mar. 17, 2015

(54) EARPIECE WITH HOLLOW ELONGATED MEMBER HAVING A NONLINEAR PORTION

(75) Inventors: Christopher F. Vlach, Northfield Center, OH (US); Tom Darbonne, Santa Cruz, CA (US)

(73) Assignee: Think-A-Move Ltd., Beachwood, OH (US)

( * ) Notice: Subject to any disclaimer, the term of this patent is extended or adjusted under 35 U.S.C. 154(b) by 389 days.

(21) Appl. No.: 13/336,457

(22) Filed: Dec. 23, 2011

(65) Prior Publication Data

US 2012/0294465 A1 Nov. 22, 2012

Related U.S. Application Data

(60) Provisional application No. 61/426,898, filed on Dec. 23, 2010.

(51) Int. Cl.
*H04R 25/00* (2006.01)

(52) U.S. Cl.
CPC ................................. *H04R 25/554* (2013.01)
USPC .................................... 381/328; 381/380

(58) Field of Classification Search
USPC ............... 381/23.1, 60, 328, 330, 380, 382
See application file for complete search history.

(56) References Cited

U.S. PATENT DOCUMENTS

| | | | |
|---|---|---|---|
| 3,819,860 A * | 6/1974 | Miller | 381/380 |
| 3,995,113 A | 11/1976 | Tani | |
| 4,017,797 A | 4/1977 | Laessig | |
| 4,025,734 A | 5/1977 | Aloupis | |
| 4,150,262 A | 4/1979 | Ono | |
| 4,429,702 A | 2/1984 | von Recklinghausen | |
| 4,628,528 A | 12/1986 | Bose et al. | |
| 4,652,702 A | 3/1987 | Yoshii | |
| 4,930,156 A | 5/1990 | Norris | |
| 4,972,491 A | 11/1990 | Wilcox, Jr. | |
| 5,164,984 A | 11/1992 | Suhami et al. | |

(Continued)

FOREIGN PATENT DOCUMENTS

| | | |
|---|---|---|
| CH | 678692 | 10/1991 |
| GB | 2197158 | 5/1988 |

(Continued)

OTHER PUBLICATIONS

Sound Radio Products™ Better Living Through Wireless Technology, printed from the internet at http://www.soundradio.com/en-921.html, Oct. 29, 2001.

(Continued)

*Primary Examiner* — Brian Ensey
(74) *Attorney, Agent, or Firm* — Renner, Otto, Boisselle & Sklar, LLP (57) ABSTRACT

An earpiece may be used to detect sounds from an ear canal of a user. The earpiece may include a microphone assembly and an acoustic pathway that is at least partially defined by a hollow elongated member having a nonlinear portion following a spiraled path. The acoustic pathway fluidly couples the microphone assembly with an ear canal of the user when the earpiece is positioned with respect to the ear of the user. Sounds produced by the user travel from the ear canal through the acoustic pathway for detection by the microphone assembly. Also, the hollow elongated member behaves as an acoustic waveguide to amplify a desired frequency and/or attenuate other, less desirable, frequencies of the sounds produced by the user.

17 Claims, 4 Drawing Sheets

(56) References Cited

U.S. PATENT DOCUMENTS

| | | |
|---|---|---|
| 5,251,263 A | 10/1993 | Andrea et al. |
| 5,280,524 A | 1/1994 | Norris |
| 5,298,692 A | 3/1994 | Ikeda et al. |
| 5,327,506 A | 7/1994 | Stites, III |
| 5,363,444 A | 11/1994 | Norris |
| 5,373,555 A | 12/1994 | Norris et al. |
| 5,426,719 A | 6/1995 | Franks et al. |
| 5,448,637 A | 9/1995 | Yamaguchi et al. |
| 5,604,812 A | 2/1997 | Meyer |
| 5,606,607 A | 2/1997 | Yamaguchi et al. |
| 5,657,384 A | 8/1997 | Staudacher et al. |
| 5,659,156 A | 8/1997 | Mauney et al. |
| 5,659,620 A | 8/1997 | Kuhlman |
| 5,664,014 A | 9/1997 | Yamaguchi et al. |
| 5,790,684 A | 8/1998 | Niino et al. |
| 5,812,659 A | 9/1998 | Mauney et al. |
| 5,832,094 A | 11/1998 | Le Her |
| 5,844,984 A | 12/1998 | Yamaguchi et al. |
| 5,881,159 A | 3/1999 | Aceti et al. |
| 5,896,451 A | 4/1999 | Deas |
| 5,933,506 A | 8/1999 | Aoki et al. |
| 6,004,274 A | 12/1999 | Nolan et al. |
| 6,021,207 A | 2/2000 | Puthuff et al. |
| 6,022,311 A | 2/2000 | Juneau et al. |
| 6,024,700 A | 2/2000 | Nemirovski et al. |
| 6,094,492 A | 7/2000 | Boesen |
| 6,175,633 B1 | 1/2001 | Morrill et al. |
| 6,181,801 B1 | 1/2001 | Puthuff et al. |
| 6,283,915 B1 | 9/2001 | Aceti et al. |
| 6,408,081 B1 | 6/2002 | Boesen |
| 6,503,197 B1 | 1/2003 | Nemirovski |
| 6,560,468 B1 | 5/2003 | Boesen |
| 6,567,524 B1 | 5/2003 | Svean et al. |
| 6,574,345 B1 | 6/2003 | Huang |
| 6,647,368 B2 | 11/2003 | Nemirovski |
| 6,661,901 B1 | 12/2003 | Svean et al. |
| 6,671,379 B2 | 12/2003 | Nemirovski |
| 6,683,965 B1 | 1/2004 | Sapiejewski |
| 6,718,043 B1 | 4/2004 | Boesen |
| 6,728,385 B2 | 4/2004 | Kvaloy et al. |
| 6,741,718 B1 | 5/2004 | Brumitt et al. |
| 6,754,358 B1 | 6/2004 | Boesen et al. |
| 6,754,359 B1 | 6/2004 | Svean et al. |
| 6,952,483 B2 | 10/2005 | Boesen et al. |
| 7,039,195 B1 | 5/2006 | Svean et al. |
| 7,079,662 B2 | 7/2006 | Niederdrank |
| 7,197,152 B2 | 3/2007 | Miller et al. |
| 7,574,917 B2 | 8/2009 | Von Dach et al. |
| 7,804,975 B2 | 9/2010 | Meier et al. |
| 8,019,107 B2 | 9/2011 | Ngia et al. |
| 2002/0118852 A1 | 8/2002 | Boesen |
| 2002/0143242 A1 | 10/2002 | Nemirovski |
| 2002/0186858 A1 | 12/2002 | Masuda et al. |
| 2003/0147544 A1 | 8/2003 | Lichtblau |
| 2003/0185403 A1 | 10/2003 | Sibbald |
| 2004/0125979 A1 | 7/2004 | Elidan et al. |
| 2005/0013456 A1 | 1/2005 | Chaluper et al. |
| 2005/0058313 A1 | 3/2005 | Victorian et al. |
| 2005/0147266 A1 | 7/2005 | Eggers et al. |
| 2005/0157895 A1 | 7/2005 | Lichtblau |
| 2006/0045297 A1* | 3/2006 | Haussmann ............ 381/328 |
| 2007/0121974 A1 | 5/2007 | Nemirovski |
| 2007/0291953 A1 | 12/2007 | Ngia et al. |
| 2008/0253583 A1 | 10/2008 | Goldstein et al. |
| 2009/0080670 A1 | 3/2009 | Solbeck et al. |
| 2009/0087003 A1 | 4/2009 | Zurek et al. |
| 2009/0209304 A1 | 8/2009 | Ngia et al. |

FOREIGN PATENT DOCUMENTS

| | | | |
|---|---|---|---|
| JP | 10-023578 | 1/1998 | |
| SE | 526085 | 6/2005 | |
| WO | 94/10818 | 5/1994 | |
| WO | 97/09927 | 3/1997 | |
| WO | 00/03639 | 1/2000 | |
| WO | 00/69215 | 11/2000 | |
| WO | 01/39662 | 6/2001 | |
| WO | WO 2010/066299 | * 6/2010 | ............ H04R 25/00 |

OTHER PUBLICATIONS

"Detection of Sensorineural Hearing mpairment by Using DPOAE Technique and Classifiers", A. Nevcihan et al., 1995 IEEE-EMBC and CMBEC, Theme 4: Signal Processing, 0-7803-2475-7/97.

Westerlund et al., "In-ear Microphone Equalization Exploiting an Active Noise Control", Proceedings of Internoise 2001, Aug. 2001, pp. 1-6.

Ngia, Lester S.H., "Separable Nonlinear Least-Squares Methods for Efficient Off-Line and On-line Modeling of Systems Using Kautz and Laguerre Filters", IEEE Transactions on Circuits and Systems—II: Analog and Digital Signal Processing, vol. 48, No. 6, pp. 562-579, Jun. 2001.

Rupp, Markus, "A Family of Adaptive Filter Algorithms with Decorrelating Properties", IEEE Transactions of Signal Processing, vol. 46, No. 3, pp. 771-775, Mar. 1998.

Yasukawa et al., "An Acoustic Echo Canceller Using Subband Sampling and Decorrelation Methods", IEEE Transactions on Signal Processing, vol. 41, No. 2, pp. 926-930, Feb. 1993.

Sjoberg et al., "Nonlinear Modeling, Advanced Black-Box Techniques", Chapter 1, "Neural Nets and Related Model Structures for Nonlinear System Identification", pp. 1-28, Kluwer Academic Publishers, 1998.

"Acoustic Waveguide Technology", Reprinted from the Internet at http://www.bose.com/controller?event=VIEW_STATIC_PAGE_EVENT&url=/learning/waveguide_overview.jsp.

"Acoustic Waveguide Technology", Reprinted from the Internet at http://www.bose.com/controller?event=VIEW_STATIC_PAGE_EVENT&url=learning/waveguide_solution.jsp.

"Effects of Sount Inlet Variations on Microphone Response", Knowles, Technical Bulletin, TB3, pp. 1-4.

"Effects of Acoustical Termination Upon Receiver Response", Knowles, Technical Bulletin, TB6, pp. 1-3.

"Effects of Source Impedance Upon Receiver Response", Knowles, Technical Bulletin, TB7, pp. 1-2.

Stevens, Kenneth (2000). Acoustic Phonetics (Current Studies in Linguistics). The MIT Press, ISBN 0-262-69250-3.

* cited by examiner

EARPIECE WITH HOLLOW ELONGATED MEMBER HAVING A NONLINEAR PORTION

RELATED APPLICATION DATA

This application claims the benefit of U.S. Provisional Patent Application No. 61/426,898 filed Dec. 23, 2010 which is incorporated herein by reference in its entirety.

TECHNICAL FIELD

The present disclosure generally relates to an earpiece having an internal microphone assembly coupled to an acoustic pathway that is at least partially defined by a hollow elongated member having a nonlinear portion following a spiraled path

BACKGROUND

Audio earpieces have become exceedingly versatile in their functionality. In addition to various audio playback capabilities, an increasing number of these earpieces allow the user to use the earpiece to detect the user's voice. As a result, earpieces have become exceedingly popular as a "hands free" device. These devices are available in both hard-wired and wireless (e.g., Bluetooth) embodiments, and may be used in conjunction with a communication device, in voice recognition, in speech recognition, and even as part of a control system to allow the user to carry out a task without the use of the user's hands.

Earpieces generally include one or more speakers that can be removably placed with respect to the user's ear and output sounds to the user's ear. They allow the user to listen to audio playback without disrupting others in the surrounding environment. In addition, "hands free" earpieces typically include a microphone used to detect speech and other vocalizations emanating from the mouth of the user.

In some "hands free" earpieces, a microphone is coupled to a hollow elongated member and positioned with respect to one of the user's ears such that acoustic signals from the user's ear propagate through the hollow elongated member to the microphone. A general disclosure of such a design is provided in US Patent Publication No. 2009/0208047. The hollow elongated member may function as an acoustic waveguide. As such, the diameter and length of the hollow elongated member are selected so that audio signals in a desired frequency range (e.g., the frequency range associated with human speech) may be amplified while other frequencies may be attenuated. The length and diameter of the hollow elongated member dictates the size of the earpiece as the housing of the earpiece must accommodate the dimensions of the hollow elongated member. As a result, the size of the earpiece may be relatively large.

SUMMARY OF THE INVENTION

Disclosed is an earpiece having an internal microphone assembly coupled to an acoustic pathway that is at least partially defined by a hollow elongated member having a nonlinear portion following a spiraled path, and that can be placed relative to a user's ear. The spiraled design of the hollow elongated member provides the functionality of an acoustic waveguide while allowing for the overall size of the earpiece to be reduced. An earpiece in accordance with the subject matter of the present disclosure may provide increased comfort to a user, and may be more suitable than previous earpiece designs including a hollow elongated member, for example, when concealment of the earpiece during use is desired.

The earpiece may be used in conjunction with a communication device (e.g. a mobile phone), a voice recognition device, a speech recognition device, and the like. The earpiece may also be used as part of a control system.

In accordance with one aspect of the claimed subject matter, an earpiece comprises: a microphone assembly; and an acoustic pathway defined at least in part by a hollow elongated member and configured such that sounds produced by a user travel from an ear canal of the user through the acoustic pathway for detection by the microphone assembly, the hollow elongated member comprising: a linear portion extending along a longitudinal axis of the earpiece; and a nonlinear portion following a spiraled path; and wherein the hollow elongated member behaves as an acoustic waveguide to modify sounds produced by the user by at least one of: amplifying a frequency selected for amplification; or attenuating a frequency selected for attenuation.

According to one embodiment, the spiraled path extends in a two-dimensional plane. According to another embodiment, the two-dimensional plane is transverse the longitudinal axis of the earpiece. According to another embodiment, the spiraled path of the nonlinear portion is at least one of a spiral of Archimedes, a hyperbolic spiral, a logarithmic spiral, or a parabolic spiral. According to another embodiment, the linear portion is joined to the nonlinear portion at a radially most extended point of the nonlinear portion.

According to another embodiment, the spiraled path of the nonlinear portion extends in three-dimensions. According to another embodiment, the spiraled path of the nonlinear portion is at least one of a helical shape. According to another embodiment, a speaker assembly is at least partially disposed within the spiraled path. According to another embodiment, the linear portion is joined to the nonlinear portion at a radially most extended point of the nonlinear portion.

According to another embodiment, the earpiece further includes a connecting portion coupling the nonlinear portion to the microphone, the connecting portion extending in a direction of the longitudinal axis.

According to another embodiment, the cross-sectional shape and area of the hollow elongated member is constant at any point along a length of the hollow elongated member.

According to another embodiment, at least part of the microphone assembly and the hollow elongated member are disposed in a housing.

According to another embodiment, the longitudinal axis of the linear portion is spaced apart with respect to a central longitudinal axis of the housing.

According to another embodiment, the linear portion extends along the longitudinal axis next to a speaker assembly.

In accordance with one aspect of the claimed subject matter, an earpiece comprises: a microphone assembly; a speaker assembly; and an acoustic pathway defined at least in part by a hollow elongated member and configured such that sounds produced by a user travel from an ear canal of the user through the acoustic pathway for detection by the microphone assembly, the hollow elongated member comprising at least a nonlinear portion following a spiraled path; wherein the speaker assembly is at least partially disposed within the spiraled path of the nonlinear portion; and wherein the hollow elongated member behaves as an acoustic waveguide to modify sounds produced by the user by at least one of: amplifying a frequency selected for amplification; or attenuating a frequency selected for attenuation.

According to one embodiment, the spiraled path of the nonlinear portion is at least one of a helical shape.

According to another embodiment, the earpiece further includes a connecting portion coupling the nonlinear portion to the microphone, the connecting portion extending in a direction of the longitudinal axis.

According to another embodiment, the cross-sectional shape and area of the hollow elongated member is constant at any point along a length of the hollow elongated member.

According to another embodiment, at least part of the microphone assembly, the speaker, and the hollow elongated member are disposed in a housing.

The foregoing and other features of the present disclosure are hereinafter described in greater detail with reference to the accompanying drawings.

DESCRIPTION

In the description that follows, like components have been given the same reference numerals, regardless of whether they are shown in different embodiments. To illustrate an embodiment(s) of the present invention in a clear and concise manner, the drawings may not necessarily be to scale and certain features may be shown in somewhat schematic form. However, to illustrate a specific embodiment, FIGS. 1-5 are shown to scale. Features that are described and/or illustrated with respect to one embodiment may be used in the same way or in a similar way in one or more other embodiments and/or in combination with or instead of the features of the other embodiments.

Disclosed are several embodiments of an earpiece including an acoustic pathway defined at least in part by a nonlinear (e.g., spiraled) hollow elongated member that is configured to convey sounds from an ear canal to an internal microphone of the earpiece through an air medium. The length and cross-sectional area of the hollow elongated member are configured such that the hollow elongated member behaves as an acoustic waveguide. As an acoustic waveguide, the hollow elongated member affects the spectrum of the captured microphone signal and emitted loudspeaker signals (e.g., amplifying desired frequencies and/or attenuating other, less desirable, frequencies). It will be understood that the ear canal of the user possesses its own acoustic properties. But the ear canal is not a part of the acoustic pathway as described in this document since the acoustic characteristics of the ear canal are difficult to control for achieving a desired speech quality.

Earpiece Design

Turning now to the figures, FIGS. 1, 2A-C, and 3 illustrate respective views of an exemplary earpiece 100. The earpiece 100 includes an earpiece housing 102 in which a speaker assembly, microphone assembly, and hollow elongated member (illustrated in the subsequent Figures) are disposed.

The earpiece housing 102 may be constructed from any suitable material, such as plastic, rubber, or the like. In one embodiment, the earpiece housing 102, or portions thereof, is made of relatively rigid plastic, but alternative embodiments may include making the earpiece housing 102 from pliable material, sound absorbing (or sound proofing) material, and/or include sound insulating material such as foam. In one embodiment, voids in the cavity of the earpiece housing 102 may be unfilled or filled with foam or other material. In another embodiment, the inside surfaces of the earpiece housing 102 may be shaped to conform to the components contained therein so that the volume of any unoccupied cavities surrounding the various components is minimized.

The earpiece housing 102 may take on a number of different physical configurations. For example, the earpiece housing 102 may resemble a miniature earphone as found in conventional telephone headsets or as used with personal audio/music players (e.g., an earbud). Alternatively, the earpiece housing 102 may resemble the housing design of a hearing aid, particularly a digital hearing aid.

As illustrated, the earpiece housing 102 is cylindrical in shape and is suitable for at least partial insertion into the ear of a person. As such, the earpiece housing 102 includes a tip portion 104 which may be placed near the opening of the ear canal or slightly into the ear canal.

Figure 1:
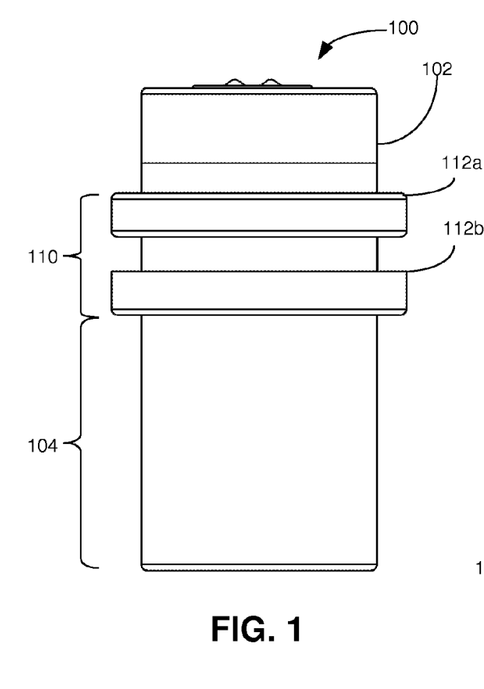
FIG. 1 is an external side view of an exemplary earpiece.
Figures 2A, 2B:
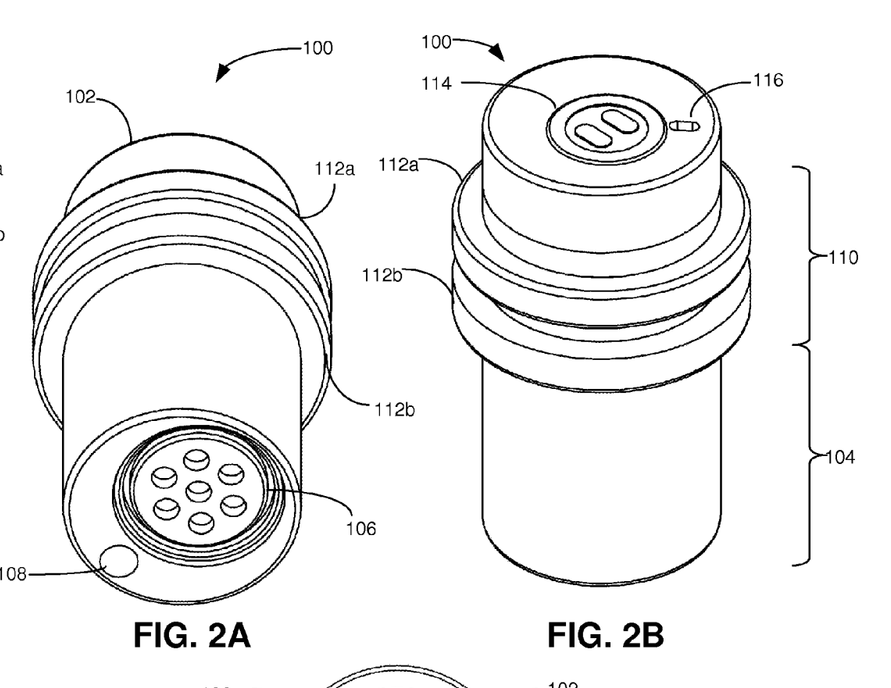
FIGS. 2A-B are external perspective views of the exemplary earpiece
Figure 3:
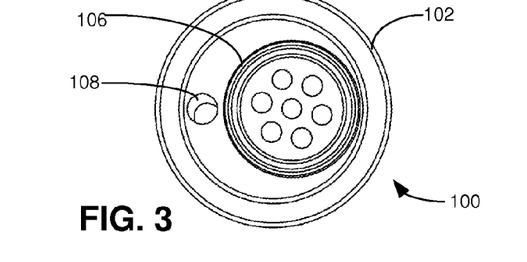
FIG. 3 is an external bottom view of the exemplary earpiece.

FIGS. 2A and 3 illustrate that the tip portion 104 includes ports that, upon insertion into the ear canal, should preferably be in fluid communication with the ear canal of the user. More specifically, the tip portion 104 of the housing 102 includes a speaker assembly port 106 that allows for sounds from the speaker assembly (described below) to emanate to the ear canal of the user. During assembly of the earpiece 100, the speaker assembly port 106 may also allow for insertion of the speaker assembly into the earpiece 100. The tip portion 104 of the housing 102 also includes an acoustic input port 108 that allows for an end of the hollow elongated member (described below) to be in fluid communication with the ear canal of the user, and allows for sounds, in, near, and/or emanating from the ear canal of the user to enter an end of the hollow elongated member.

Friction between the housing 102 and the ear may hold the earpiece 100 in place with respect to the ear of the user. Earpiece 100 includes a rib portion 110 that assists in holding the earpiece 100 in place. In one embodiment, one or more ribs 112a and 112b of the rib portion are constructed of a resilient material, such as a foam, plastic, gel, rubber, or the like. Some compression of the one or more ribs 112a and 112b may occur upon insertion and the earpiece 100 into the ear canal of a user so as to conform to the anatomy of the user's ear and fluidly seal the ear canal of the user from the surrounding environment. In another embodiment, the one or more ribs 112a and 112b may be a rigid material used to retain an additional structure attached to the earpiece housing 102 to assist in holding the earpiece 1 in the ear canal of the user. Although not illustrated, a resilient outer covering (e.g., made of foam, plastic, gel, rubber, or the like) may cover at least the tip portion 104 and/or rib portion 110 of the housing 102 conform to the anatomy of the user's ear and fluidly seal the ear canal of the user from the surrounding environment upon insertion and the earpiece 100 into the ear canal of a user. In alternative embodiments, the outer covering may be additionally or alternatively secured to the earpiece housing 102 with adhesive or other bonding means.

With continued reference to FIG. 2B, the end of the earpiece housing 102 distal the tip portion 104 may include a microphone assembly port 114 that allows for the coupling of one or more wires to the microphone assembly, and may also allow for insertion of the speaker assembly into the earpiece 100 (e.g., during assembly). This end may also include a wire port 116 for passing one or more wires to the speaker assembly. Accordingly, one or more wires (not illustrated) may extend from the earpiece housing 102, and may couple the operative components of the earpiece 1 to an electronic device. Alternatively, the earpiece 100 may include a wireless transceiver, such as a Bluetooth transceiver, for wirelessly exchanging signals with an electronic device. Although not illustrated, an outer covering may cover at least the end of the earpiece housing 102 distal the tip portion 104. The outer covering may define a shape of the earpiece and may be configured to allow a user to hold the earpiece during insertion and/or removal of the earpiece 100 from the ear canal. The outer covering may also direct any wires extending from the earpiece housing and may additionally house a wireless transceiver if included with the earpiece.

Figure 4A:
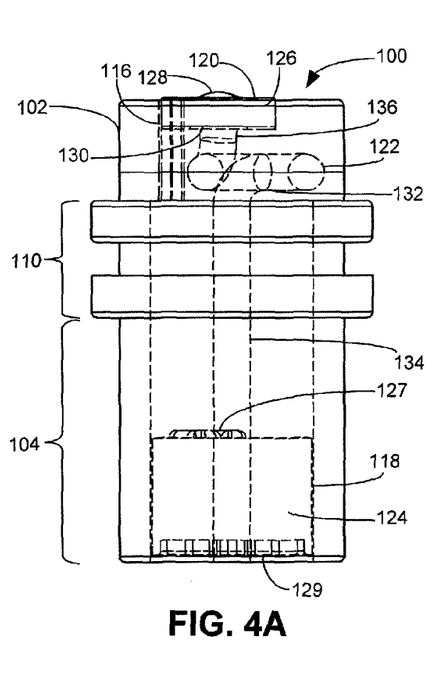
FIGS. 4A-C are partially broken away side views of the exemplary earpiece containing a microphone, hollow elongated member, and speaker.
Figure 4B:
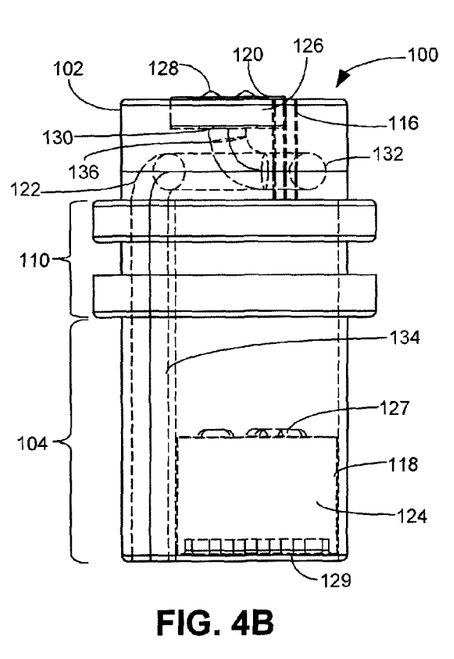
Figure 4C:
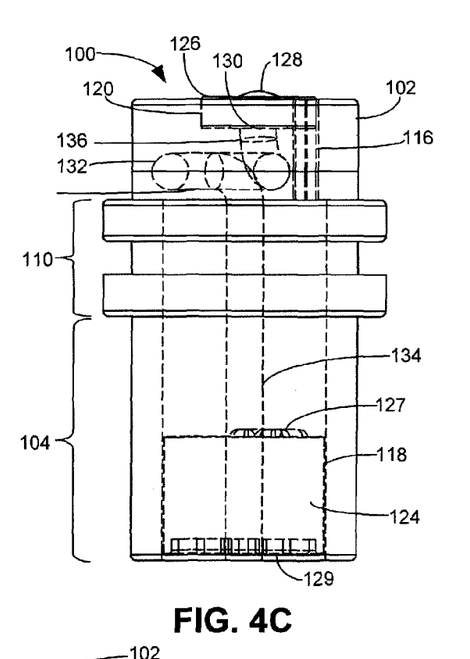
Figure 5:
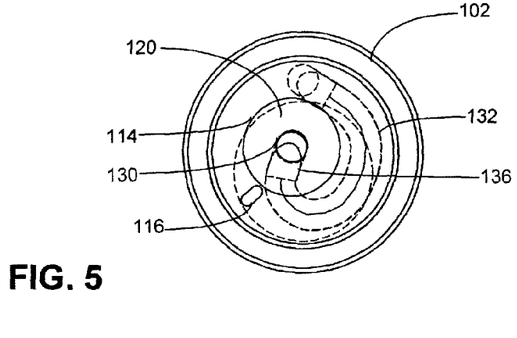
FIG. 5 is a partially broken away bottom view of the exemplary earpiece containing a microphone, hollow elongated member, and speaker.

With additional reference to FIGS. 4A-C, a speaker assembly 118, microphone assembly 120, and hollow elongated member 122 are disposed within and supported by the housing 102 of the earpiece 100.

In the illustrated embodiment, the speaker assembly 118 is disposed in the tip portion 104 of the earpiece housing 102 and is configured to output acoustic signals to the ear canal of the user. The speaker assembly 118 includes a speaker housing 124 for housing a speaker (not illustrated), one or more contacts 127 for coupling the speaker to an electronic device using wires and/or a wireless transmitter, and one or more speaker outlets 129 that allow the sound of the speaker to emanate to the ear canal of the user. Any suitable speaker may be used in the earpiece of the present application. Examples of commercial speakers suitable for this application include ED Series speakers, BK series speakers, and CM Series speakers manufactured by Knowles, 1151 Maplewood Drive, Itasca, Ill. 60143.

The microphone assembly 120 is disposed in and supported by the end of the earpiece housing 102 distal the tip portion 104, and is configured to detect sounds, in, near, and/or emanating from the ear canal of the user. The microphone assembly 120 includes a microphone housing 126, a microphone (not illustrated) to convert the detected sounds into an electrical signal, one or more contacts 128 for coupling the microphone to an electronic device using wires and/or a wireless transmitter, and an inlet 130 that allows the acoustic signals from the ear canal to emanate to the microphone. The microphone assembly is configured to detect, for example, speech, grunts, whistles, singing, coughs, clicking sounds made by movement of the lips or tongue, and the like. A description of tongue and other vocal and non-vocal commands that may be captured from an ear of the user may be found in U.S. Pat. No. 6,503,197, which is incorporated herein by reference in its entirety. Furthermore, any suitable microphone may be used in the internal microphone assembly. Examples include OWMO-4015 Series microphones manufactured by Ole Wolff Manufacturing, Inc., 150 North Michigan Avenue, Suite 2800, Chicago, Ill. 60601, and MAA-03A-L Series manufactured by Star Micronics America, Inc., 1150 King Georges Post Road, Edison, N.J. 08837.

The hollow elongated member 122 is also disposed in and supported by the earpiece housing 102 and fluidly couples the microphone assembly 120 to the acoustic input port 108. Accordingly, the hollow elongated member 122 defines an acoustic pathway configured to pass the sounds, in, near, and/or emanating from the ear canal of the user from the acoustic input port 108 to the microphone assembly 122. Specifically, at one end, the hollow elongated member 122 is secured to the microphone assembly 120 such that the inner pathway formed by the hollow elongated member 122 is in fluid communication with inlet 130. At the other end, the hollow elongated member 122 is secured to the acoustic input port 108 such that the inner pathway formed by the hollow elongated member 122 is in fluid communication with the ear canal of the user when the earpiece is inserted in the user's ear. In one embodiment, an end of the hollow elongated member 122 may be press-fit to the microphone assembly 120 and/or the acoustic input port 108, respectively. For example, the inlet 130 and/or the acoustic input port 108 may be respectively formed as a countersink opening, and a respective end of the hollow elongated member 122 may be pressed into the inlet 130 and/or the acoustic input port 108 and retained by frictional forces. In other embodiments, the respective ends of the hollow elongated member 122 may be additionally or alternatively retained by adhesive or the like.

At least a part of the hollow elongated member 122 may behave as an acoustic waveguide. A general description of acoustic waveguides may be found in U.S. Patent Publication No. 2009/0208047, which is incorporated herein by reference in its entirety. The addition of an acoustic waveguide to an earpiece assembly allows for manipulation of the resonance frequencies of the earpiece assembly to achieve amplification and/or attenuation at certain frequencies. These manipulations are achieved by varying the length, the cross-sectional area, and/or material of the acoustic waveguide. Accordingly, by changing the dimensions of the acoustic waveguide, one can optimize the performance of the earpiece, as well as customize the earpiece to meet the specific needs of a user.

In accordance with the present disclosure, at least a portion of the hollow elongated member 122 is nonlinear (e.g., spiraled) in shape. The cross-sectional shape and area of the hollow elongated member 122 is constant or substantially constant at any point along a length of the hollow elongated member. Furthermore, the hollow elongated member 122 may be constructed of a material, such as TYGON®, PTFE, or the like. These features allow the hollow elongated member to function as an acoustic waveguide, and are described in more detail below.

Waveguide Acoustics

The properties of an acoustic waveguide generally may be understood from the theory of acoustics. The following describes the derivation of a theoretical model exemplifying the performance of various embodiments of an acoustic waveguide, wherein the acoustic waveguide is modeled by a tube component.

Assuming planar wave propagation with no losses, the sound pressure p(x,t) and the volume velocity U(x,t) in a tube are related by equations 1 and 2, as derived from Newton's law and compressibility considerations, where A is the cross-sectional area of the tube at the point x, $P_O$ is the ambient pressure, $\rho$ is the ambient density of the air (0.00114 gm/cm$^3$ for air at body temperature), and $\gamma$ is the ratio of specific heat at constant pressure to specific heat at constant volume (1.4 for air).

$$\frac{\partial p(x,t)}{\partial x} = -\frac{\rho}{A(x)} \frac{\partial U(x,t)}{\partial t} \qquad \text{Eq. 1}$$

$$\frac{\partial U(x,t)}{\partial x} = -\frac{A(x)}{\gamma P_O} \frac{\partial p(x,t)}{\partial t} \qquad \text{Eq. 2}$$

Assuming exponential dependence on time, $p(x,t)=p(x)e^{j2\pi ft}$ and $U(x,t)=U(x)e^{j2\pi ft}$, where p(x) and U(x) represent complex amplitudes of sound pressure and volume velocity respectively, and f represents frequency. Insertion of p(x,t) and U(x,t) into equations 1 and 2 is represented by equations 3 and 4.

$$\frac{dp(x)}{dx} = -\frac{j2\pi f \rho}{A(x)} U(x) \qquad \text{Eq. 3}$$

$$\frac{dU(x)}{dx} = -\frac{j2\pi f A(x)}{\gamma P_O} p(x) \qquad \text{Eq. 4}$$

Elimination of U(x) by the combination of equations 3 and 4 is represented by equation 5, where $k=2\pi f/c$, and $$c = \sqrt{\frac{\gamma P_O}{\rho}}$$

is the velocity of sound. For air at the temperature of the body, c is equal to 35,400 cm/s.

$$\frac{d^2 p(x)}{dx^2} + \frac{1}{A(x)} \frac{dA(x)}{dx} \frac{dp(x)}{dx} + k^2 p = 0 \qquad \text{Eq. 5}$$

For uniform tubes, A(x) is equal to constant A, and equation 5 reduces to the one-dimensional wave equation as represented by equation 6.

$$\frac{d^2 p(x)}{dx^2} + k^2 p = 0 \qquad \text{Eq. 6}$$

A generalized solution equation 6 yields p(x), as represented by equation 7.

$$p(x) = p_m \sin(kx) + q_m \cos(kx) \qquad \text{Eq. 7}$$

Substitution of equation 7 into equation 4 yields U(x), as represented by equation 8.

$$U(x) = j\frac{A}{\rho c k} \frac{dp(x)}{dx} = j\frac{A}{\rho c}(p_m \cos(kx) - q_m \sin(kx)) \qquad \text{Eq. 8}$$

Figure 6:
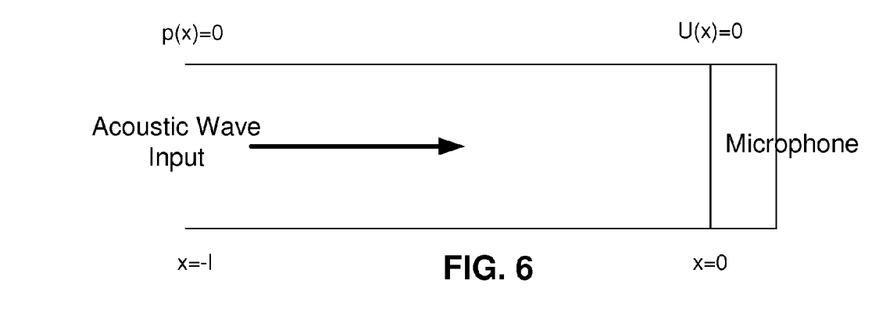
FIG. 6 is a representation of a uniform tube, where one end is open and the other end is rigidly blocked by a microphone.

FIG. 6 represents a uniform tube, where one end of the tube is opened to receive acoustic wave input and the other end is rigidly blocked by a microphone. For such a tube, the boundary conditions are: p(x)=0 at x=−l and U(x)=0 at x=0. Because U(x)=0 at x=0, it is implied that $p_m$=0. Therefore, the substitution of these boundary conditions into equations 7 and 8 yield equations 9 and 10, the solution for the one-dimensional wave equation for such a tube.

$$U(x) = -j\frac{A}{\rho c} q_m \sin(kx) \qquad \text{Eq. 9}$$

$$p(x) = q_m \cos(kx) \qquad \text{Eq. 10}$$

The boundary condition at x=−l is satisfied when cos(kl)=0, or if $$\frac{2\pi f l}{c} = \frac{(2n-1)\pi}{2},$$

where n is an integer. Therefore, the formant frequencies of the tube of FIG. 11 are represented by equation 11, where the formant frequencies of the tube may be controlled by changing the length of the tube.

$$F_n = \frac{2n-1}{4} \frac{c}{l} \qquad \text{Eq. 11}$$

For example, if l=2.75 cm, $$F_n = \frac{2n-1}{4} \times \frac{35400}{2.75} \text{Hz},$$

or approximately 3218 Hz, 9654 Hz, 16090 Hz, . . . , for n=1, 2, 3, . . . , respectively.

Figure 7:
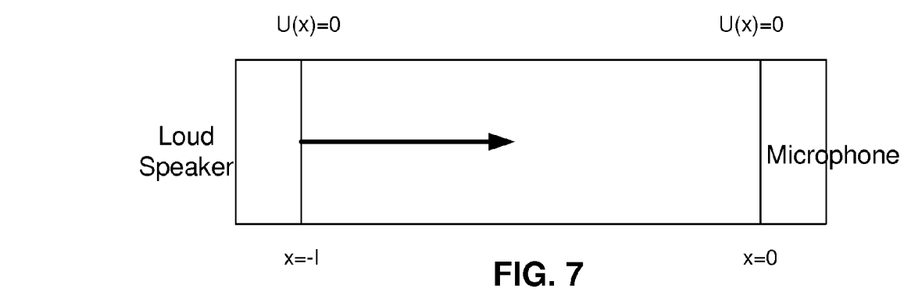
FIG. 7 is a representation of a uniform tube, where one end is rigidly blocked by a loudspeaker and the other end is rigidly blocked by a microphone.

FIG. 7 represents another uniform tube, where one end of the tube is rigidly blocked by a loudspeaker and the other end is rigidly blocked by a microphone. For such a tube, the boundary conditions are: U(x)=0 at x=0 and x=−l. Because U(x)=0 at x=0, it is implied that $p_m$=0. Therefore, as with the embodiment in FIG. 11, the solution for the one-dimensional wave equation for such a tube at the boundary condition is represented by equations 9 and 10. However, in this embodiment, the boundary condition at x=−l is satisfied when sin(kl)=0, or $$\text{if } \frac{2\pi f l}{c} = n\pi,$$

where n is an integer. Therefore, the formant frequencies of the tube of FIG. 12 are represented by equation 12, where the resonant frequencies of the tube where both ends are rigidly blocked may be controlled by changing the length of the tube. Resonance frequency is the frequency at which a system oscillates at its maximum amplitude.

$$F_n = \frac{n}{2}\frac{c}{l} \qquad \text{Eq. 12}$$

For example, if l=8.25 cm, $$F_n = \frac{n}{2} \times \frac{35400}{8.25}\text{Hz},$$

or approximately 2145 Hz, 4291 Hz, 6436 Hz, . . . , for n=1, 2, 3, . . . , respectively.

The amplification provided by the acoustic waveguide depends on the loss characteristics of the acoustic waveguide. Higher losses lead to wider bandwidths, which, therefore implies a smaller amplification at the resonant frequency. On the other hand, smaller losses lead to narrower bandwidths and, therefore, larger amplification for the resonant frequencies. The loss characteristics of the acoustic waveguide may be controlled by varying the cross-sectional area and the material of the component(s) that behaves as the acoustic waveguide.

Various losses may be a factor in the acoustic waveguide performance. For example, the loss characteristic of a uniform tube may be influenced by the finite impedance of the walls of the tube. The increase in bandwidth of the resonances due to the resistive component of the finite impedance of the walls of the tube is represented by equation 13, where $G_{sw}$=the specific acoustic conductance (i.e., conductance per unit area) of the walls, A=cross-sectional area of the uniform tube, and S=cross-sectional perimeter of the uniform tube.

$$B_w = \frac{G_{sw}S\rho c^2}{2\pi A} \qquad \text{Eq. 13}$$

The loss characteristic of the tube may also be influenced by viscous friction at the walls of the tube. The increase in bandwidth of the resonances due to viscous friction at the walls of the tube is represented by equation 14, where $$R_V = \frac{S}{A^2}\sqrt{\frac{\omega\rho\mu}{2}}, \omega = 2\pi f,$$

and $\mu$=coefficient of viscosity=$1.86\times 10^{-4}$ poise (dyne-s/cm$^2$).

$$B_V = \frac{R_V A}{2\pi\rho} \qquad \text{Eq. 14}$$

Additionally, the loss characteristic of the tube may be influenced by heat conduction at the walls of the tube. The increase in bandwidth of the resonances due to heat conduction loss at the walls of the tube is represented by equation 15, where $$G_h = S\frac{0.4}{\rho c^2}\sqrt{\frac{\lambda\omega}{2c_p\rho}},$$

$\lambda$=coefficient of heat conduction=$5.5\times 10^{-5}$ cal/cm-s-degree, and, $c_p$=specific heat of air at constant pressure=0.24 cal/gm-degree.

$$B_h = \frac{G_h \rho c^2}{2\pi A} \qquad \text{Eq. 15}$$

Equations 13 to 15 demonstrate that the increase in bandwidth is inversely proportional to the cross-sectional area of the tube. Thus, tubes with small cross-sectional area will have high losses and therefore, wide bandwidths, whereas tubes with large cross-sectional areas will have small losses and therefore, narrow bandwidths. An estimate of the combined increase in bandwidth due to these losses may be obtained by summing the contributions of each of the above effects. Also, note that these losses will also have some impact on the exact location of the resonant peak.

Experiment 1

Figure 8:
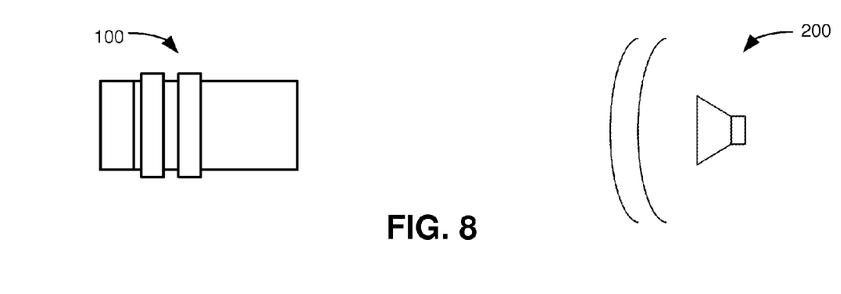
FIG. 8 is a representation of an experimental test platform that includes an earpiece similar to that in FIGS. 1-5 and a laboratory loudspeaker.

Referring to FIG. 8, a representation of an experiment test platform is illustrated. The platform includes an earpiece 100 similar to that of FIG. 2 and a laboratory loudspeaker 200. The experiment is conducted with two different earpieces, each having an hollow elongated member of a different length.

A reference white noise is played at 84 dBA with the laboratory loudspeaker 20 and recorded through the internal microphone assembly 120 of the earpiece 100. Two hollow elongated members (acoustic pathways) with effective lengths of 1.8 cm and 2.75 cm are tested in the experiment for evaluating the resonance frequency when attached to the microphone. In the experiment, the internal diameter of the hollow elongated members 122 is 1.27 mm. The lengths of the hollow elongated members 122 are 1.8 cm and 2.75 cm, respectively.

Figure 9:
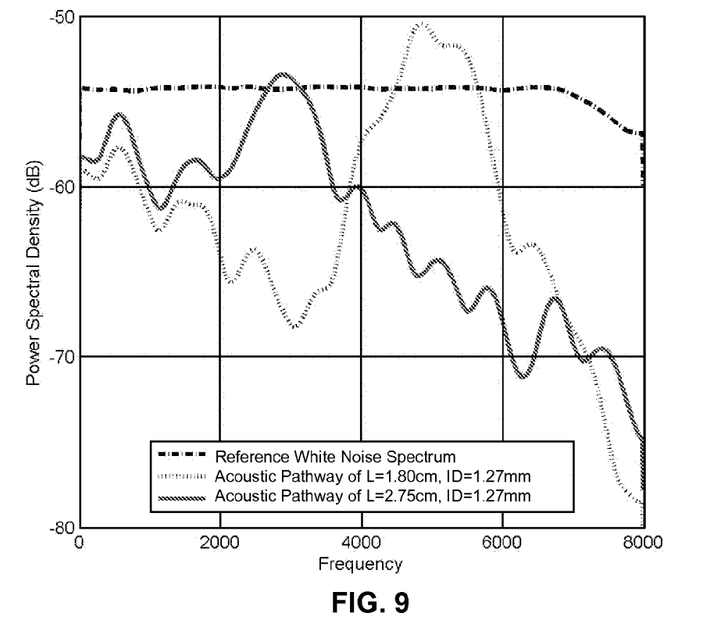
FIG. 9 is a plot of power spectral density of a reference white noise signal as recorded over a given frequency range with the test platform of FIG. 8 in which the tube length is varied.

Referring to FIG. 9, a plot of the power spectral density of the reference white noise of length 10 seconds, power spectral density of white noise recorded by the earpiece with the 1.8 cm pathway, and power spectral density of white noise recorded by the earpiece 100 with the 2.75 cm hollow elongated member is shown. FIG. 9 demonstrates the effect the length of the acoustic waveguide has on shaping the white noise spectrum. For the earpiece with the 2.75 cm pathway, the first prominence is at about 2890 Hz. For the earpiece with the 1.8 cm pathway, the first prominence is at about 4860 Hz. Therefore, the longer the hollow elongated member (acoustic waveguide) is in length, the lower the first peak is in frequency.

Based on the theory, the first resonance of the acoustic waveguide will be at frequency f=c/4l. If the length of the acoustic waveguide is 1.8 cm, then the resonance should be at a frequency of 4916 Hz (assuming c=35400 cm/s). If the length of the acoustic waveguide is increased to 2.75 cm, then the resonance should be at a frequency of 3218 Hz. Therefore, the measured resonance frequencies are close to the theoretical values, and support the theory that changing the length of the acoustic waveguide helps in amplifying frequencies in the desired frequency range.

Experiment 2

Figure 10:
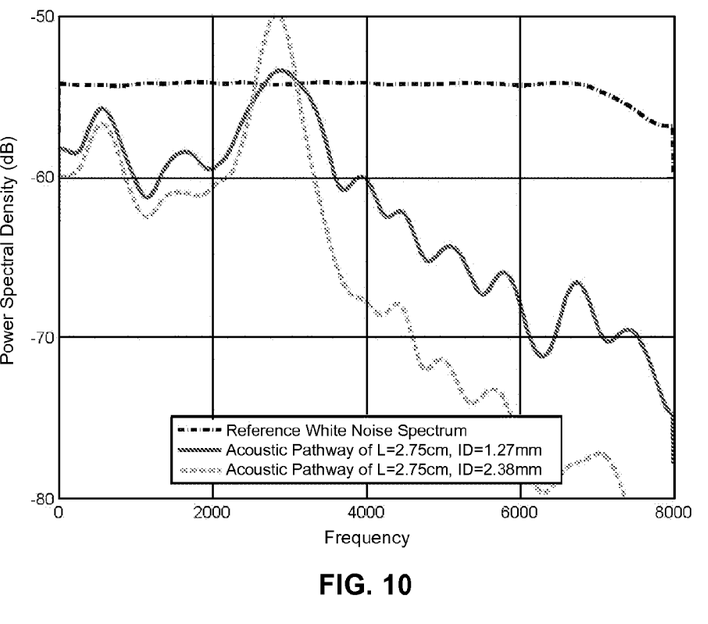
FIG. 10 is a plot of power spectral density of a reference white noise signal as recorded over a given frequency range with the test platform of FIG. 8 in which the tube diameter is varied.

An experiment similar to experiment 1 is conducted to test amplification properties of the hollow elongated member as an acoustic waveguide. In this experiment, the test platform of FIG. 8 is used and white noise is recorded with a microphone using two hollow elongated members 122 of varying cross-sectional area. A hollow elongated member 122 with an internal diameter of 1.27 mm and another hollow elongated member 122 with an internal diameter of 2.38 mm, respectively, are tested. Both hollow elongated members 122 have the same effective length of 2.75 cm. Referring to FIG. 10, a plot of the power spectral density of the reference white noise of length 10 seconds, power spectral density of white noise recorded by the earpiece 100 with the 1.27 mm tube, and power spectral density of white noise recorded by the earpiece 100 with the 2.38 mm tube is shown. As predicted by theory, the hollow elongated member 122 with the internal diameter of 2.38 mm has lower losses (exhibited by sharper peaks) and higher amplitude than the tube with an internal diameter 1.27 mm. Furthermore, the resonance frequencies of both tubes are not very different.

Hollow Elongated Member

One may conclude from the results of Experiments 1 and 2 that one embodiment of a hollow elongated member 122 coupled to a microphone assembly 120 of an earpiece 100 may have an effective length of about 2.75 cm (about 1.08 inches) and a component or components with an internal diameter of about 1.27 mm (about 0.05 inches). As discussed above, implementation of the effective length of the hollow elongated member 122 results in a larger size earpiece.

Therefore, in accordance with the present disclosure, at least a portion the hollow elongated member 122 may be nonlinear in shape, such as a spiraled shape. Nonlinear (i.e., curvilinear) shapes will not significantly affect the acoustic properties of the acoustic waveguide so long as the curvature does not impart a cusp in the hollow elongated member 122 or curve around too small of a radius. The nonlinear shape may allow a hollow elongated member of a longer length to fit within the confines of a smaller housing.

With reference to FIGS. 4A-C and 5, the hollow elongated member 122 may include a nonlinear portion 132, a linear portion 134, and a connecting portion 136. In the illustrated embodiment, the nonlinear portion 132 of the hollow elongated member 122 is proximate the microphone assembly 120. The linear portion 134 is fluidly coupled to one end of the nonlinear portion 132 and extends along the longitudinal axis of the earpiece 100 adjacent the rib portion 110 and the tip portion 104 of the housing 102. The connecting portion 136 is fluidly coupled to the other end of the nonlinear portion 132 and couples the nonlinear portion 132 to the microphone assembly 120.

As illustrated, the nonlinear portion 132 may follow a spiraled path. The spiraled path extends in a two-dimensional plane which may be transverse the longitudinal axis of the earpiece. The particular spiraled path of the nonlinear portion 132 may be any suitable spiraled shape, so long as the curvature does not impart a cusp in the hollow elongated member 122 or curve around too small of a radius to significantly affect the acoustic properties of the acoustic waveguide. For example, the spiraled path of the nonlinear portion 132 may be at least one of a spiral of Archimedes, a hyperbolic spiral, a logarithmic spiral, or a parabolic spiral.

In other embodiments, the nonlinear portion 132 may extend in three-dimensions. For example, the spiraled path of the nonlinear portion may form a helical shape. As such, the nonlinear portion 132 may extend in a direction of the longitudinal axis of the housing and be adjacent to at least one of the rib portion 110, the tip portion 104, and/or the speaker assembly 118. Because the nonlinear portion 132 may include a helical shape, in one embodiment, at least a portion of the speaker assembly 118 may actually be disposed within spiraled path of the nonlinear portion 132.

The linear portion 134 of the hollow elongated member 122 is joined to the nonlinear portion 132 at a radially most extended point of the nonlinear portion and extends along the longitudinal axis of the housing 102. Hence, the linear portion is off-center with respect to the housing such that the longitudinal axis of the linear portion 134 is spaced apart with respect to a central longitudinal axis of the housing 102. In an embodiment where both a cross-section of the hollow elongated member 122 and the housing are circular, the linear portion 134 may be considered eccentric (i.e. non-concentric) with respect to the housing. The linear portion 134 may extend in the direction of the longitudinal axis of the housing and be adjacent to at least one of the rib portion 110, the tip portion 104, and the speaker assembly 118. As illustrated in FIGS. 4A-C, the linear portion 134 extends parallel with the longitudinal axis of the earpiece 100. Of course, in other embodiments, the linear portion 134 may extend in a non-parallel manner. The end of the linear portion 134 distal the nonlinear portion 134 is in fluid communication with the acoustic input port 108.

The connecting portion 136 of the hollow elongated member 136 is joined to the nonlinear portion 132 at a radially least extended point and couples the nonlinear portion to the microphone assembly 120. The connecting portion extends in a direction of the longitudinal axis of the housing 104 and may form a linear or nonlinear path.

The shape of the hollow elongated member allows for the desired amplification and/or attenuation performance, while allowing the overall size of the earpiece 100 to be reduced. For example, in accordance with the examples described above, the hollow elongated member 120 has an length of length of about 2.75 cm (about 1.08 inches) and an internal diameter of about 1.27 mm (about 0.05 inches). Yet the earpiece 100 housing 102 is only about 1.6 cm (about 0.633 inches) in length and about 0.787 cm (about 0.31 inches) in diameter.

While the above description focuses primarily on a hollow elongated member in combination with a microphone assembly, it is appreciated that in some embodiments, it is desired to amplify and/or attenuate frequencies of sound emitted from the speaker assembly. US Patent Publication No. 2009/0208047 provides a description of the use of a hollow elongated member in combination with a speaker assembly, and is hereby incorporated by reference in its entirety. While the dimensions of the hollow elongated member may differ in an embodiment where the hollow elongated member is coupled to a speaker assembly, the above-described principles still apply. In some embodiments, only the speaker assembly may have an associated hollow elongated member.

In other embodiments, both the microphone assembly and the speaker assembly may have respective hollow elongated members. In such an embodiment, the nonlinear portions of the respective hollow elongated members may extend in a two-dimensional plane transverse the longitudinal axis of the piece at different locations along the longitudinal axis of the earpiece. In another example, the nonlinear portions of the respective hollow elongated members may extend in three-dimensions, the paths thereof collectively forming a double helix (i.e., dancing helix) shape.

Although particular embodiments of the invention have been described in detail, it is understood that the invention is not limited correspondingly in scope, but includes all changes, modifications, and equivalents coming within the spirit and terms of the claims appended hereto.

What is claimed is:

1. An earpiece, comprising:
a microphone assembly; and
an acoustic pathway defined at least in part by a hollow elongated member and configured such that sounds produced by a user travel from an ear canal of the user through the acoustic pathway for detection by the microphone assembly, the hollow elongated member comprising:
    a linear portion extending along a longitudinal axis of the earpiece; and
    a nonlinear portion following a spiraled path;
wherein the spiraled path extends in a two-dimensional plane and the linear portion is joined to the nonlinear portion at a radially most extended point of the nonlinear portion; and
wherein the hollow elongated member behaves as an acoustic waveguide to modify sounds produced by the user by at least one of:
    amplifying a frequency selected for amplification; or
    attenuating a frequency selected for attenuation.

2. The earpiece of claim 1, wherein the two-dimensional plane is transverse the longitudinal axis of the earpiece.

3. The earpiece of claim 1, wherein the spiraled path of the nonlinear portion is at least one of a spiral of Archimedes, a hyperbolic spiral, a logarithmic spiral, or a parabolic spiral.

4. The earpiece of claim 1, further including a connecting portion coupling the nonlinear portion to the microphone, the connecting portion extending in a direction of the longitudinal axis.

5. The earpiece of claim 1, wherein the cross-sectional shape and area of the hollow elongated member is constant at any point along a length of the hollow elongated member.

6. The earpiece of claim 1, wherein at least part of the microphone assembly and the hollow elongated member are disposed in a housing.

7. The earpiece of claim 1, wherein the longitudinal axis of the linear portion is spaced apart with respect to a central longitudinal axis of the housing.

8. The earpiece of claim 1, wherein the linear portion extends along the longitudinal axis next to a speaker assembly.

9. An earpiece, comprising:
a microphone assembly; and
an acoustic pathway defined at least in part by a hollow elongated member and configured such that sounds produced by a user travel from an ear canal of the user through the acoustic pathway for detection by the microphone assembly, the hollow elongated member comprising:
    a linear portion extending along a longitudinal axis of the earpiece; and
    a nonlinear portion following a spiraled path;
wherein the spiraled path of the nonlinear portion extends in three-dimensions and the linear portion is joined to the nonlinear portion at a radially most extended point of the nonlinear portion; and
wherein the hollow elongated member behaves as an acoustic waveguide to modify sounds produced by the user by at least one of:
    amplifying a frequency selected for amplification; or
    attenuating a frequency selected for attenuation.

10. The earpiece of claim 9, wherein the spiraled path of the nonlinear portion is at least one of a helical shape.

11. The earpiece of claim 9, wherein a speaker assembly is at least partially disposed within the spiraled path.

12. An earpiece, comprising:
a microphone assembly;
a speaker assembly; and
an acoustic pathway defined at least in part by a hollow elongated member and configured such that sounds produced by a user travel from an ear canal of the user through the acoustic pathway for detection by the microphone assembly, the hollow elongated member comprising at least a nonlinear portion following a spiraled path;
wherein the speaker assembly is at least partially disposed within the spiraled path of the nonlinear portion; and
wherein the hollow elongated member behaves as an acoustic waveguide to modify sounds produced by the user by at least one of:
    amplifying a frequency selected for amplification; or
    attenuating a frequency selected for attenuation.

13. The earpiece of claim 12, wherein the spiraled path of the nonlinear portion is at least one of a helical shape.

14. The earpiece of claim 12, further including a connecting portion coupling the nonlinear portion to the microphone, the connecting portion extending in a direction of a longitudinal axis of the earpiece.

15. The earpiece of claim 12, wherein the cross-sectional shape and area of the hollow elongated member is constant at any point along a length of the hollow elongated member.

16. The earpiece of claim 12, wherein at least part of the microphone assembly, the speaker, and the hollow elongated member are disposed in a housing.

17. The earpiece of claim 12, wherein
the spiraled path of the nonlinear portion extends in three-dimensions; and
the hollow elongated member further comprises a linear portion extending along a longitudinal axis of the earpiece.

* * * * *